United States Patent [19]

Berti et al.

[11] Patent Number: 5,027,233
[45] Date of Patent: Jun. 25, 1991

[54] METHOD FOR DETERMINING SERVO POSITION DATA IN A DISK DRIVE

[75] Inventors: Eugenio Berti; Ashraf I. El-Sadi, both of San Jose, Calif.

[73] Assignee: Unisys Corp. (Formly Burroughs Corp.), Detroit, Mich.

[21] Appl. No.: 233,877

[22] Filed: Aug. 12, 1988

Related U.S. Application Data

[63] Continuation of Ser. No. 528,291, Aug. 31, 1983, abandoned.

[51] Int. Cl.$^5$ .............................................. G11B 5/596
[52] U.S. Cl. ............................. 360/77.02; 360/77.05; 360/77.08
[58] Field of Search ............... 360/77.01, 77.02, 77.05, 360/77.07, 77.08, 77.11, 135, 78.05, 78.14

[56] References Cited

U.S. PATENT DOCUMENTS

| | | | |
|---|---|---|---|
| 3,691,543 | 9/1972 | Mueller | 360/77 |
| 4,068,269 | 1/1978 | Commander et al. | 360/78 |
| 4,163,265 | 7/1979 | van Herk et al. | 360/77.08 |
| 4,238,809 | 12/1980 | Fujiki et al. | 360/77 |
| 4,380,033 | 4/1983 | Bacrania | 360/77 |
| 4,539,607 | 9/1985 | Fujiki | 360/77.08 |

OTHER PUBLICATIONS

IBM TDB vol. 18, No. 10, "Track Following Servo System", Oswald, Mar. 1976, pp. 3424-3425.
IBM TDB vol. 22, No. 18, "Quad-Burst Servo Pattern" Liu, May 1980, pp. 5436-5438.

Primary Examiner—Aristotelis M. Psitos
Assistant Examiner—Steven R. Garland
Attorney, Agent, or Firm—John J. McCormack; Nathan Cass; Mark T. Starr

[57] ABSTRACT

Shown is a disk drive arrangement with servo-mechanism for controlling (thin-film) head position, etc.; the servo having a disk face dedicated to servo tracks, rendered in "Quad" code, with special timing indicia to separate position indicia, with position signals being deployed to follow, and to be terminated by, like, distinct timing sequences.

4 Claims, 14 Drawing Sheets

FIG. 3A. SLAVO TIMING

FIG. 6. POSITION SERVO BLOCK DIAGRAM.

FIG. 7. ACCESS SERVO BLOCK DIAGRAM.

FIG. 8. SERVO A.G.C. BLOCK DIAGRAM.

FIG. 9. PHASE LOCKED LOOP BLOCK DIAGRAM.

FIG.11.

OFFSET CALIBRATION BLOCK DIAGRAM

METHOD FOR DETERMINING SERVO POSITION DATA IN A DISK DRIVE

This application is a continuation of application Ser. No. 528,291, filed Aug. 31, 1983, now abandoned.

The present invention relates to methods and associated apparatus for positioning transducers over a selected track on associated moving disk surfaces; more particularly, it relates to controlling servomechanisms for such purposes.

BACKGROUND, FEATURES

Workers are familiar with the use of servo tracks, recorded on moving disks. Servo information is recovered from such tracks by a transducer, and then may be decoded to indicate any positional deviation of the transducer from a center-track position. Such techniques are well known for finding specific locations, or benchmarks, along disk tracks and thereby reduce head-positional errors in the placing of a head over the disk, or bring the head into some registration. Such methods are also used to position read/write transducers over other moving media. U.S. Pat. No. 3,691,543 to Mueller shows such a system, as does U.S. Pat. No. 4,380,033 to Bacamia.

Workers recognize that various kinds of servo tracks have been used, depending on the application; ranging from "dedicated" tracks, containing nothing but position information, to signal storage tracks, with servo information interspersed among stored data signals, to data storage tracks which themselves provide servo information where special means are provided to interpret the servo-signals.

Various forms of servo readback signals are also known. One is the sophisticated, two element so-called "tribit" track (e.g., taught by Mueller in U.S. Pat. No. 3,691,543).

The Mueller system postulates a disk with a servo track, a transducer for picking up two position-indication signals from the servo track, a servo for positioning the transducer, and a feedback circuit with a two-channel demodulator for separating the two position indicating signals, comparing them, and responsively generating a feedback signal to the servo. As the transducer approaches and crosses the servo track, the position-indicating signals change, altering the comparator signal to in turn, modify the servo signal.

For these and other reasons, it is usually desirable to provide means for enhancing the precision of the servo signals. This teaching is so oriented.

Here taught is a servo signal format especially apt for use with thin film magnetic R/W transducers and with a "Quad" type positioning code. Among other advantages, this will be seen to enhance linearity of servo response and to help reduce error due to servo-track offset (e.g., eliminating tail-overshoot, using "timing" signals to isolate position signals).

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 5 is composed of FIGS. 5.-1 and 5.-2. FIGS. 5.-1 and 5.-2 form a block diagram of servo control features in the preferred disk drive, while FIGS. 6, 7, 8 and 9 particularize, respectively, the position servo, access servo, automatic gain control and phase locked loop aspects thereof;

DESCRIPTION OF THE PREFERRED EMBODIMENT

GENERAL DESCRIPTION, BACKGROUND

Figure 1:
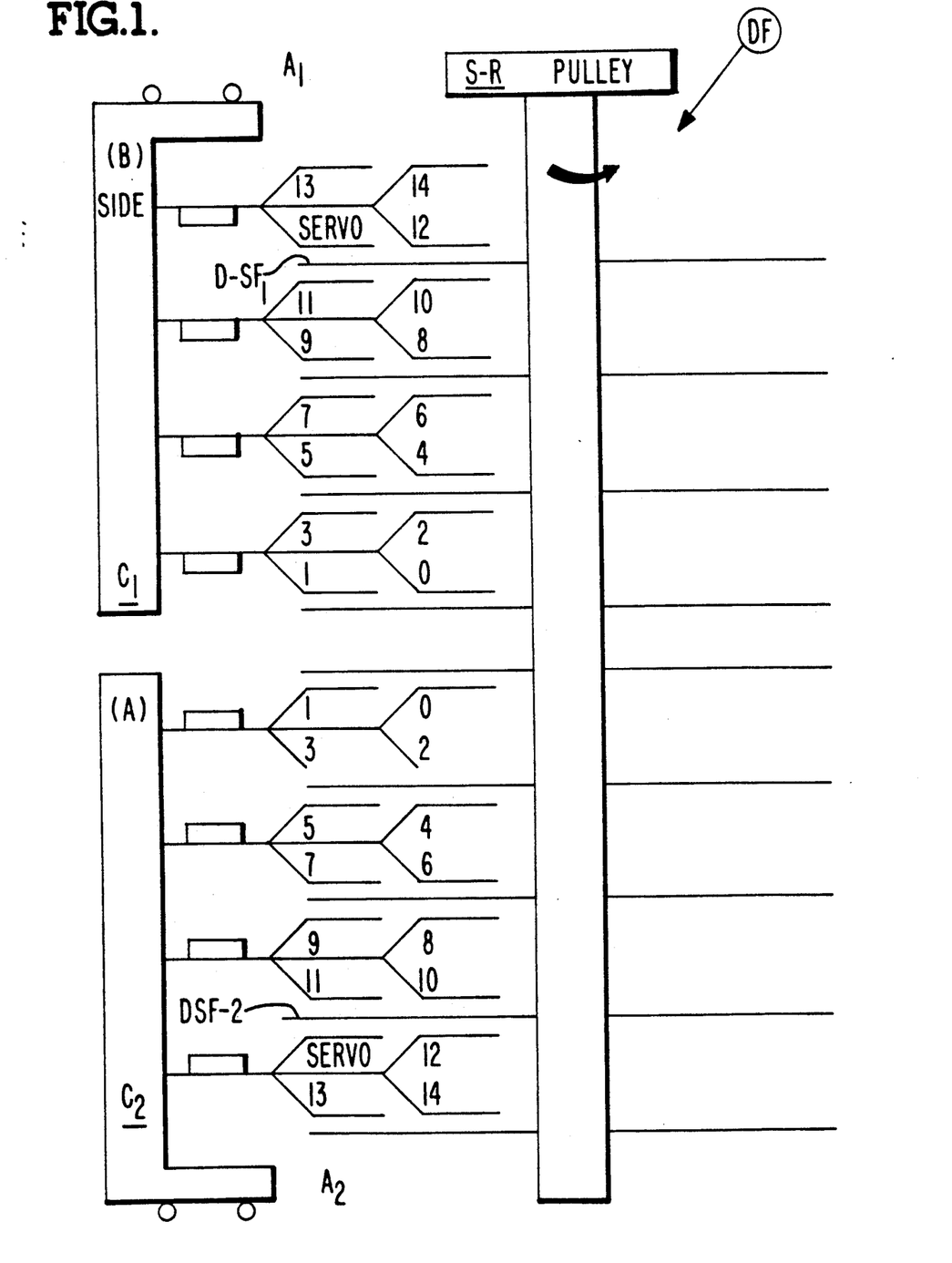
FIG. 1 is a very schematic side view of a disk file with actuators.

FIG. 1 schematically illustrates a disk file (magnetic records) constructed as known and according to principles of this invention. This, and other devices discussed herein, will generally be understood as constructed and operating as presently known in the art, except where otherwise specified. And, except as otherwise specified, all materials, methods and devices and apparatus herein will be understood as implemented by known expedients and according to present good practice.

DISK FILE (FIG. 1)

For present purposes, it will be assumed that a subject disk file DF (FIG. 1) is served by two like actuator arrays; i.e., by arrays $A_1$ and $A_2$, each comprising an array of data transducers (#1 through #14 shown) plus a servo transducer. Each array is carried by a respective common translation means (see carriages C1, C2, etc.) as well known in the art.

Figure 1A:
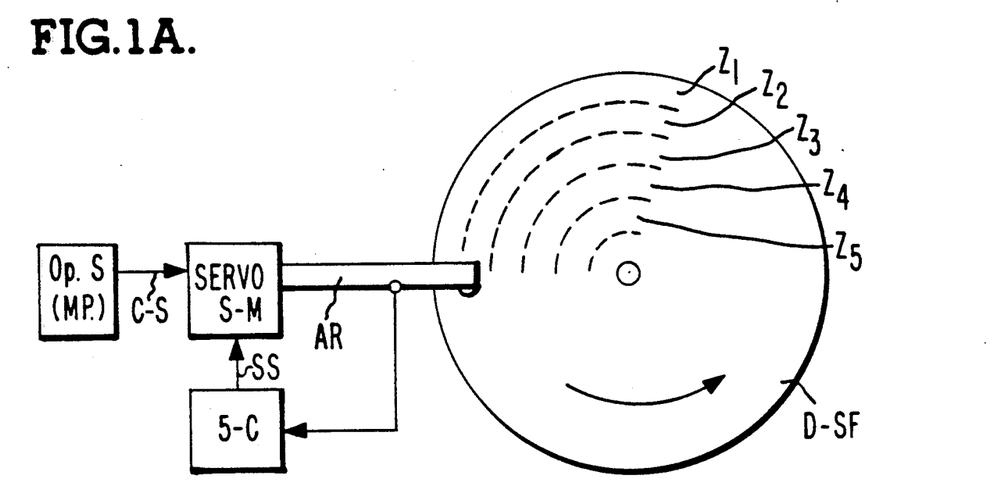
FIG. 1A shows, very generally and schematically, the related servomechanism-control elements for one servo disk (FIG. 12 shows related servo control elements more particularly)

FIG. 1A indicates, in very general block diagram form, a typical servo control arrangement as here contemplated, wherein a known servo unit S-M will be understood as translating a related magnetic servo transducer mounted on associated arm AR across various servo tracks on the surface of magnetic disk surface D-SF$_1$ (see also FIG. 1). Workers will understand that servo data is stored along concentric servo tracks on surface D-SF (here, assume four groups, or zones, of tracks: $Z_1$, $Z_2$, $Z_3$, $Z_4$; plus the usual "guard bands" and other dedicated portions of DSF, as well known in the art).

The disk or disk file (DF, FIG. 1) will be understood as conventionally rotated during operation (see arrows, pulley S-R in FIG. 1). Each servo track is concentric with a respective "data track". Information (servo) is written on, and recovered from the servo tracks via the indicated magnetic transducer, whose radial position is controlled by servo S-M as workers understand. This transducer thus can provide servo output signals sa; these may be fed to servo control means S-C (details below) which may responsively generate feedback servo control signals ss applied to control the servomechanism S-M. The servo mechanism S-M may also be controlled by signals c-s from the disk file controller (operating system Op.S. portions of related disk file microprocessor —see below)

GENERAL CONCEPT OF THE DISK FILE SERVO

The head positioning servo-mechanism of the disk file will operate to perform three main functions:
1. Access the heads to the required track in minimum time;
2. Maintain the position of the recording heads exactly over the track-center with minimum displacement errors, despite the presence of disturbances; and
3. Generate an interface servo clock constantly locked to disk position and with minimum jitter— this used to write data on the disk.

These functions require continuous position information in both axial and lateral directions. We dedicate a servo head and associated (disk) servo-surface for the position information of each actuator array (see $A_1$, $A_2$ arrays, FIG. 1 surfaces $DSF_1$, $DSF_2$).

SERVO SURFACE DESCRIPTION (FIG. 2)

The servo surface is used as a geometrical and timing reference for all other surfaces of the disk module. The servo surface provides the means to implement (1) Head positioning and track following; (2) Write timing (Write Clock); (3) Index sensing; and (4) Rotational position sensing.

ROTATIONAL SPEED

For the following timing relationships, a nominal rotational speed of 3600 rpm is assumed.

Servo Frame Interval.

Each recorded servo band is divided into 6216 equal intervals, called servo frame intervals. Each interval corresponds in time to eight data bytes on any data track and is 2.681 us, nominal.

Each servo frame consists of six sync areas and four position areas. The first sync. area defines the beginning of the servo frame.

Each "0-coded" servo frame has a sync pulse in each of the six sync areas. An 0-coded servo frame is decoded as a zero by the guardband detectors (see FIG. 3).

Each "1-coded" servo frame is exactly like the 0-coded servo frame of the same servo band, except that it is missing the second sync pulse. A 1-coded servo frame is decoded as a one by the guardband detectors (see FIG. 3).

Servo Track.

A servo track is defined as the track upon which the servo head centers itself. The servo track is the boundary between two recorded servo bands.

The servo tracks are numbered from the OD (outer diameter) radially-inward towards the ID (inner diameter); servo tracks 000 through 958 corresponding to the 959 data tracks. Each even-numbered servo track is preceded by a SP0- or SP2-band, and each odd-numbered servo track is preceded by a SP1- or SP3-band. (See FIG. 2 re band layout.)

Figures 3, 3A:
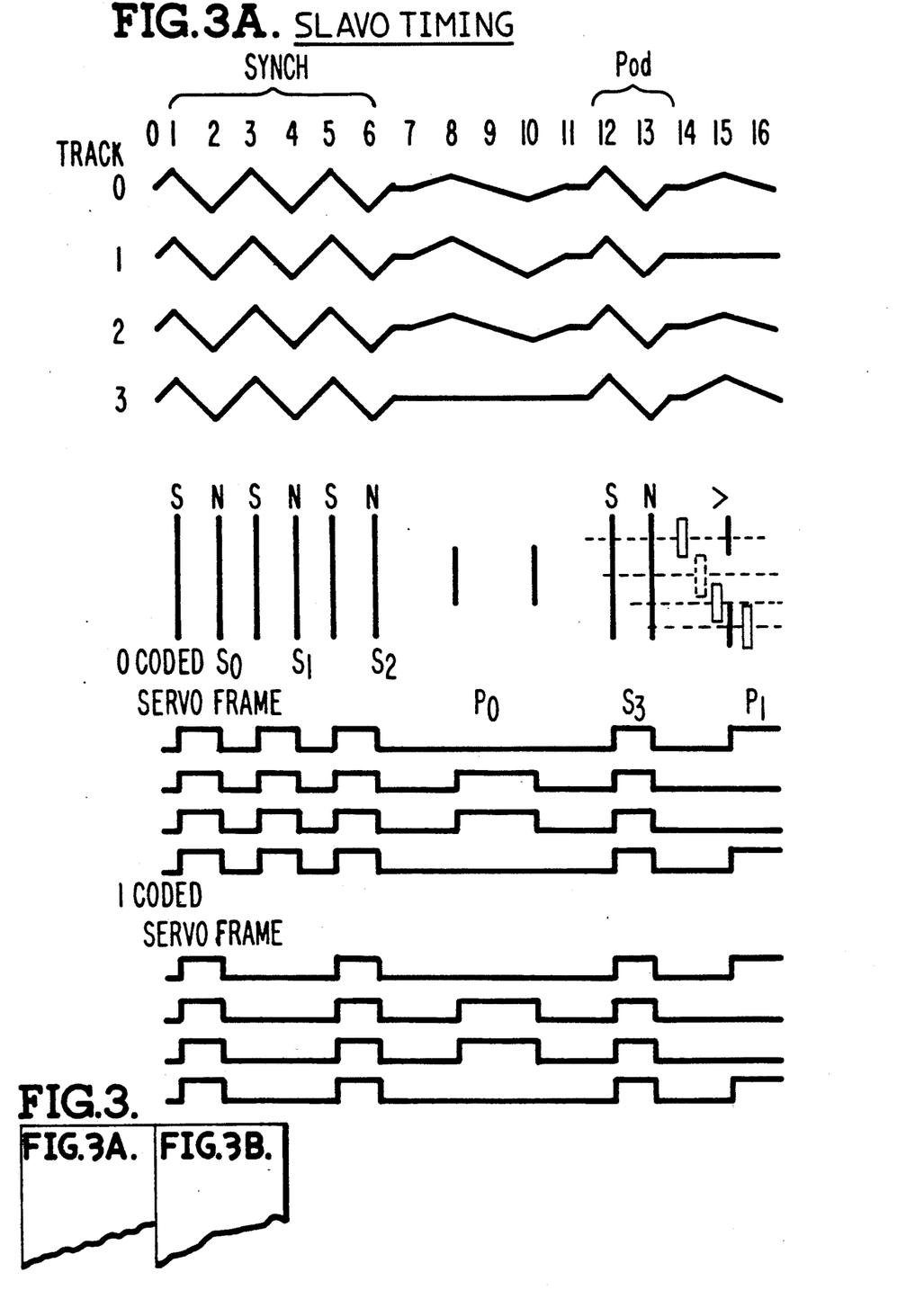
FIG. 3 is composed of figures a plot of exemplary servo timing signals, some being explained in FIG. 4.
Figure 3B:
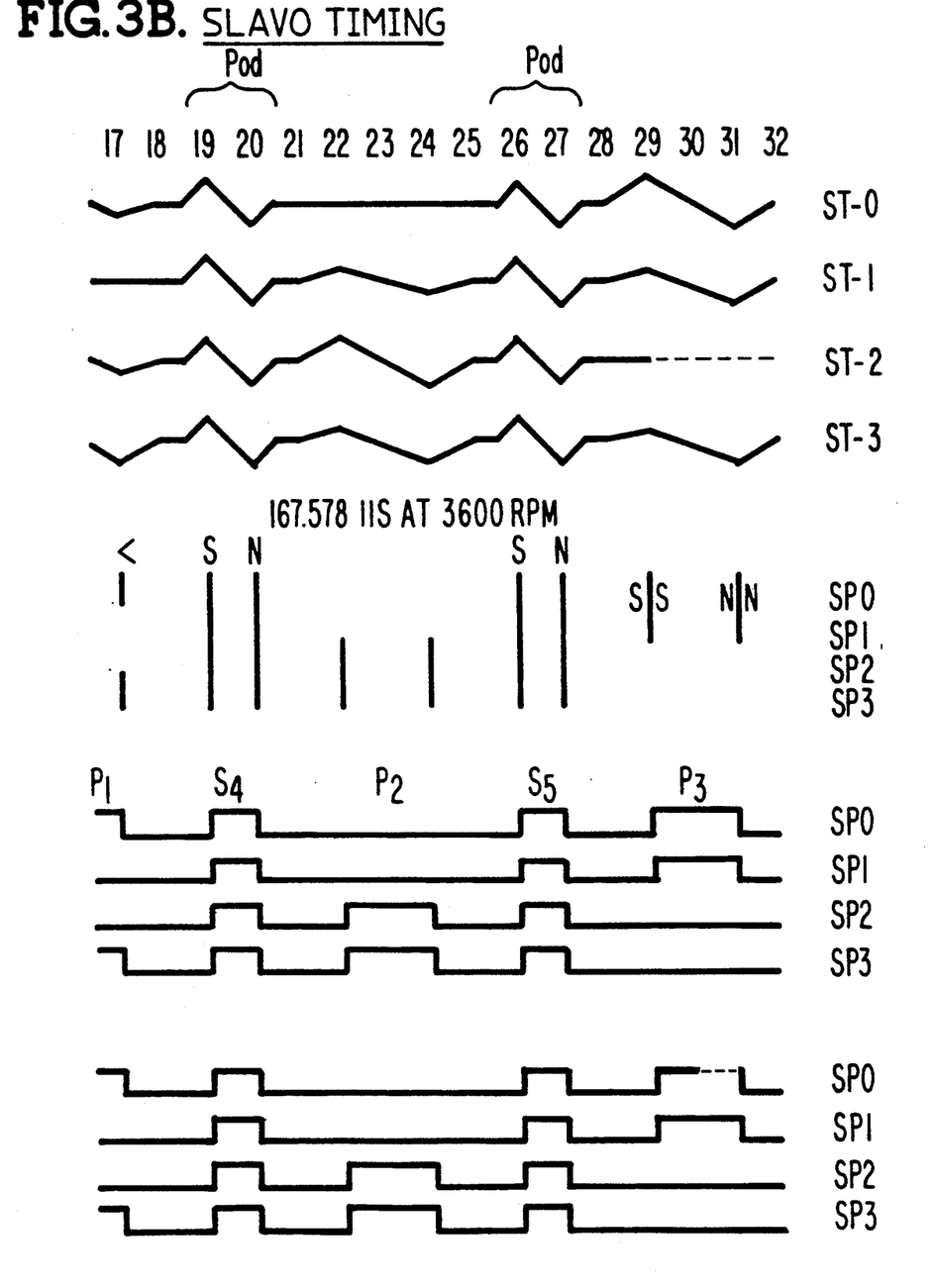

Each servo band consists of 6216 servo frames each being made up of six sync areas and four position areas, as shown in FIG. 3. Each position area is 2/32T wide. Each sync area is 1/32T wide, where T is the period of the servo frame.

The servo frames have five or six sync pulses in the sync areas (as defined elsewhere).

Servo Pattern #ST-0: is a band consisting of 6216 frames with position pulses in the position areas that begin at 15/32T and 29/32T (See FIG. 3).

Servo Pattern #ST-1: is a band consisting of 6216 frames with position pulses in the position areas that begin at 8/32T and 29/32T.

Servo Pattern #ST-2: is a band consisting of frames with position pulses in the position areas that begin at 8/32T and 22/32T.

Servo Pattern #ST-3: is a band consisting of 6216 frames with position pulses in the position areas that begin at 15/32T and 22/32T.

The relationship between the dibit pattern and disk magnetization polarity is shown in FIG. 3. Combination of two servo patterns results in the "On Track" read signal.

Thus, each servo band is recorded into 6216 intervals. Each interval, called, a servo frame, corresponds in time to eight data bytes (2.681 us). Each servo frame divides into six sync areas and four position areas, in a "quadrature" pattern. The servo track is the center of two servo "bands", with a nominal spacing between the servo tracks of 1240.7±15 u inches.

HDA (each face DFS) is divided into 5 zones. In each zone the servo bands are written in sequence SP1, SP2, SP3, except in the rezero zone, where it is written SP0, SP0, SP0.
1. Guard Band 2
2. Guard Band 1
3. Rezero Zone
4. Data Area
5. I.D. Area A servo frame is coded "1" if the "second" sync pulse is missing. "Even/Odd" indexes are written on all servo bands with five frames width, once per band and spaced evenly around the band. "Index" determines the beginning of the track. Thus:

Even Index Code: 10110
Odd Index Code: 10011

Inner and outer guard bands are coded by 5 servo frames every 74 frames around the!rr servo bands, as follows:
GB1 Code: 10101
GB2 Code: 11100
ID Area Code: 11010

Figure 2:
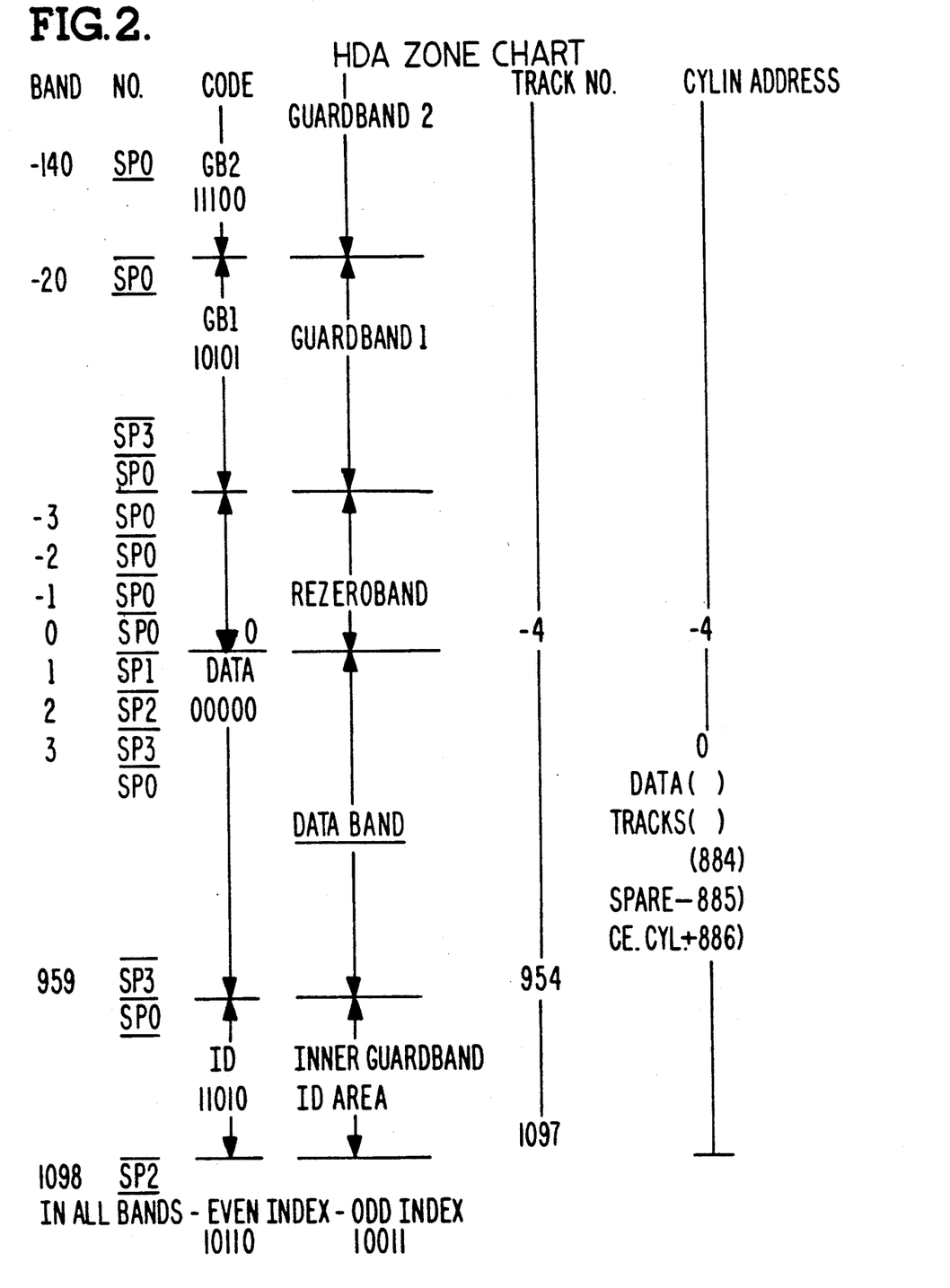
FIG. 2 is a chart of head-disk actuator zones.

Usable "customer cylinders" for data recording are cylinders 0 to 844 (#885 is a spare and #886 a C.E. cylinder, see FIG. 2).

Servo Head Positions and Servo Track Geometry

Line of Access and Alignment of Servo Head.

The read-gap of the servo head moves radially along a line through the axis of disk rotation. (cf. with offset within ±0.005 inch, from the outermost to innermost track.)

Data Track Centerline is given by the servo head position on the line of access for which the read signal contains equal amplitudes of the positive peaks of two servo patterns. This read signal is produced by adjacent servo bands (see FIG. 3).

Specific servo tracks are at the locations listed below. (Given are radial distances from the centerline of the spindle for "on track" locations.)

Servo Track Spacing (S): Nominal spacing S is about 0.001241 here, lying between the centerlines of the servo tracks along the line of access. Spacing S is also the nominal spacing between the data track centerlines along the line of access.

Servo Track Numbering: The centerline of the recorded servo bands are spaced nominally halfway between the track centerlines. Therefore, track centers correspond to having the servo head travel on the line between servo bands. These tracks are numbered from the location of track 000 sequentially toward the center of rotation.

Data Zone: The data zone contains 886 bands of a repeating pattern SP0, SP1, SP2 and SP3 servo patterns from band 000 to 886.

Rezero Zone: The rezero zone contains 4 bands, having servo pattern 0.

Guardband Pattern No. 1: The pattern for Guardband No. 1 consists of a combination of five 1-coded and 0-coded servo frames encoding 10101. Each 0-coded servo frame represents "0" and each 1-coded servo frame represents "1". (See FIG. 3.)

Outer Guardband Zone: The outer guardband contains 120 bands of a repeating pattern SP0, SP1, SP2 and SP3. Each band contains Guardband Pattern No. 2 at 74-frame intervals after each index pattern. (See FIG. 2.)

Guardband Pattern No. 2: The pattern for Guardband No. 2 consists of a combination of five 1-coded and 0-coded servo frames encoding 11100. Each, 0-coded servo frame represents "0" and each 1-coded servo frame represents "1" (See FIG. 3.)

Inner Guardband Zone: The inner guardband contains 139 bands, sequencing through the four servo patterns. Each band contains ID Guardband pattern at 74-frame intervals after each index pattern. (See FIG. 2.)

Inner Guardband Pattern: The pattern for the Inner Guardband consists of a combination of five 1-coded and 0-coded servo frames including 11010. Each 0-coded servo frame represents "0" and each 1-coded frame represents "1". (See FIG. 3.)

Index: Each physical track has two indexes. The "even" index is the point which defines the beginning and the end of a track.

Index Pattern: Each index consists of a combination of five 1-coded and 0-coded servo frames encoding either: 10110 for an even index, or 10011 for an odd index. Each 0-coded servo frame represents "0" and each 1-coded servo frame represents "1".

Index Geometry: Both index patterns are recorded on all servo tracks and spaced evenly.

SERVO TIMING SIGNALS (FIG. 3)

Recapitulating the above, workers will perceive that each of the track groups (zones) is made up of "quad" encoded servo tracks, each preceded by one of four kinds of servo bands: ST-0, ST-1, ST-3, ST-4, as indicated in FIG. 3. These are repeated radially, in order, across the zone (thus: ST-0, ST-1, ST-2, ST-3, ST-3, ST-0, ST-1, etc.). Four exemplary bands, 1.6758 us long (at 3600 rpm), are indicated in FIG. 3. Each band comprises six timing points. The tracks are juxtaposed (e.g., 1.24 mils wide, radially, —for head-gap which is about 2.0 mils wide and is intended to "straddle" track centers —thus, spanning a nominal 1.0 mils (or about 80% of each (of two adjacent) tracks.)

For all four bands, (ST-0 etc.), it will be noted that the pulse patterns are identical in respect of timing information (see initial sync pulses $S_0$, $S_1$, $S_2$; then re-sync or "padding" pulses $S_3$, $S_4$, $S_5$, interspersed with four position pulses $P_0$, $P_1$, $P_2$, $P_3$). This is shown in simplified form in FIG. 4 where, for a given (zone) coding, the decoded position pulses are simplistically represented in 1/0 form.

Figure 4:
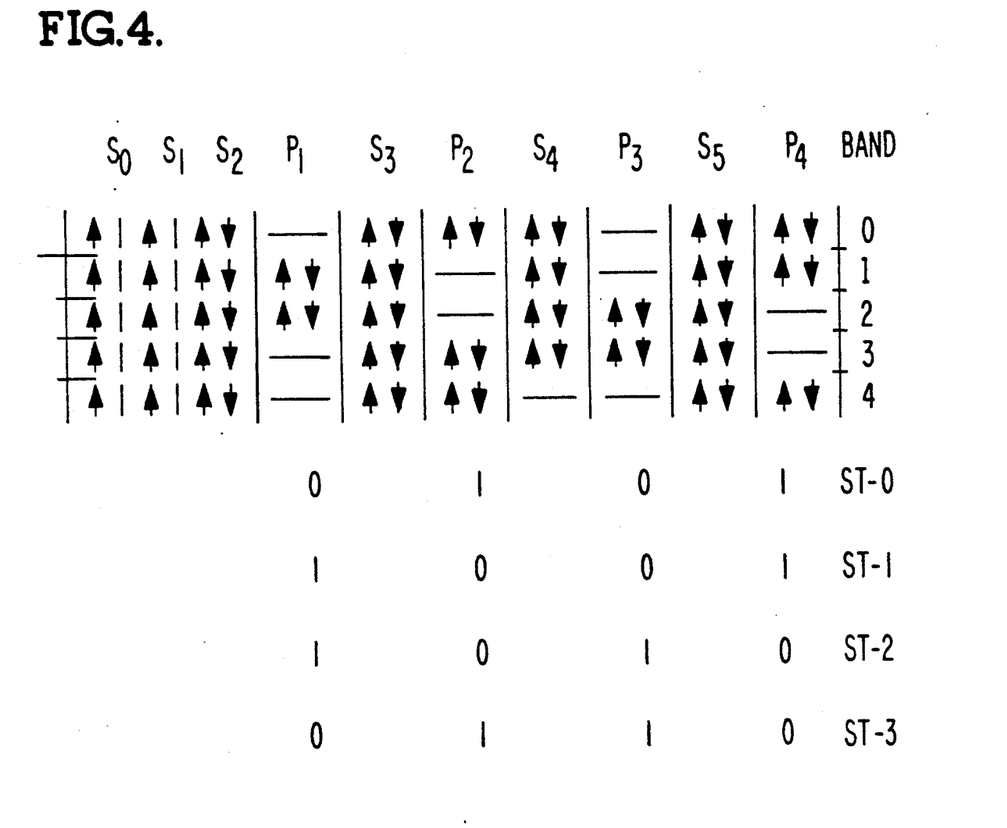

Such a pattern will be seen as "protecting" (i.e., isolating and trimming) position pulses on both sides by like ("padding" or sync) timing pulses —preventing position pulses from interfering with one another. As a result, the demodulated signal can define track centerline very precisely. A 90° phase separation-time/space between "primary" and "quad." position signals can be obtained by following sequence $P_0$, $P_1$, $P_2$, $P_3$; a very linear relation is kept between position transition space (distance head travels) and the demodulated position signal. Workers will especially appreciate the enhanced linearity (note: thin film heads tend to give a position pulse output with an overshooting "tail"; this is minimized where they are so terminated by a "padding" pulse).

Figures 5, 52:
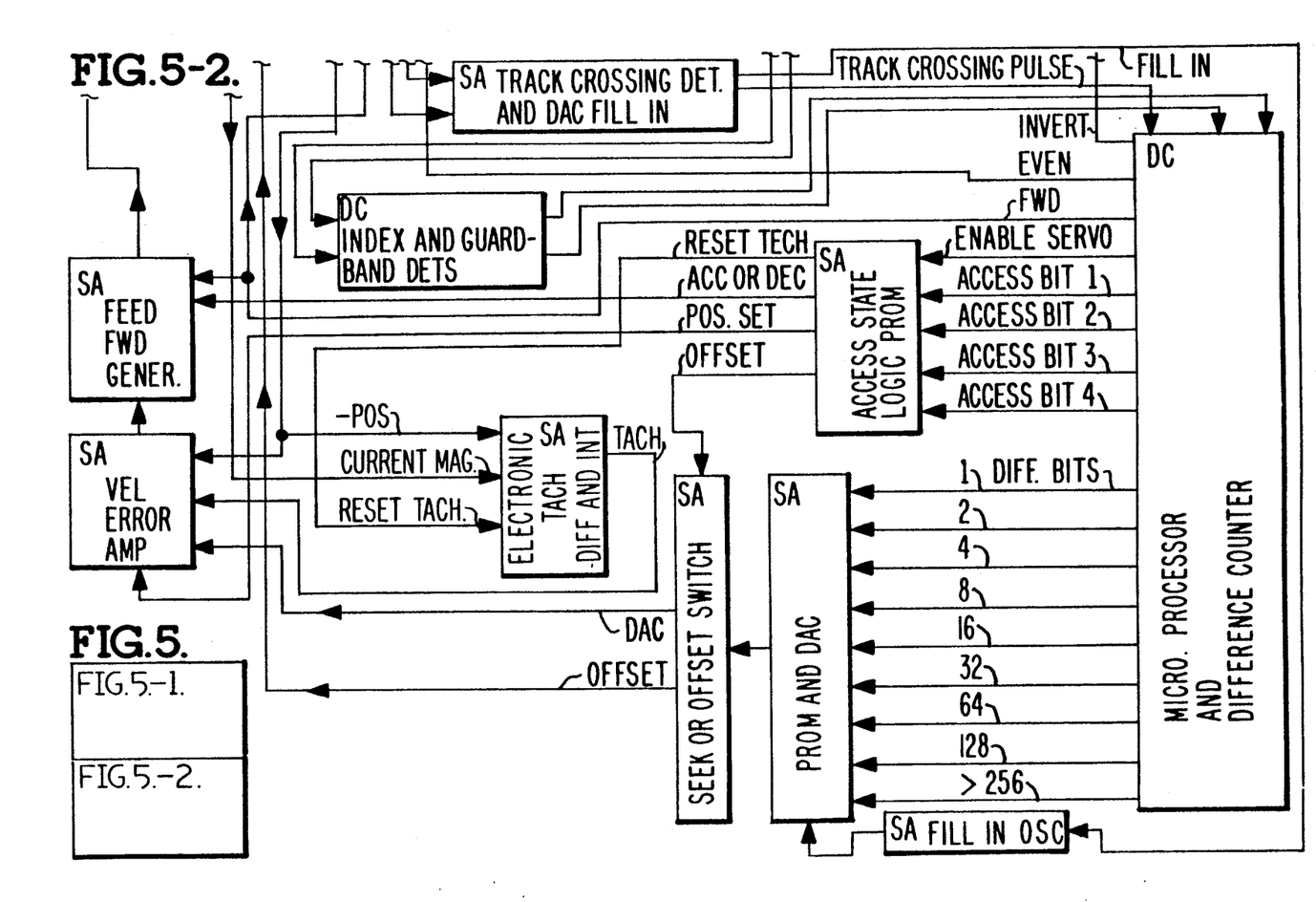
Figure 5A:
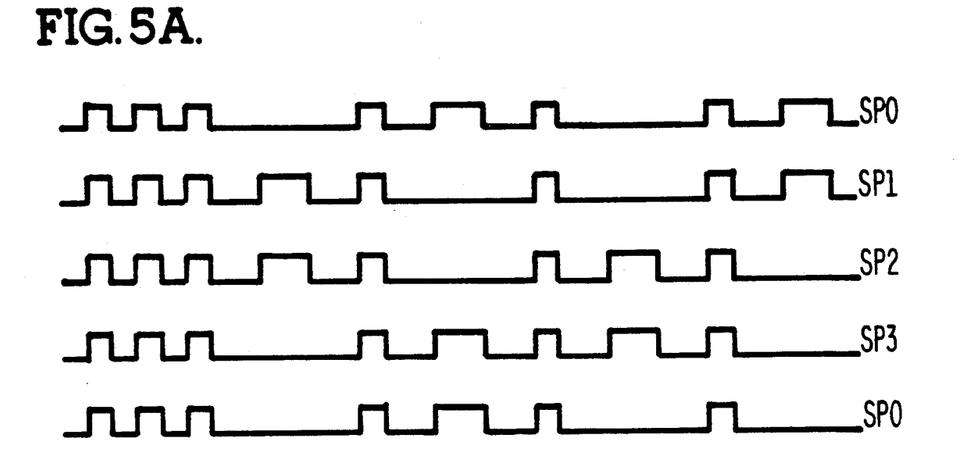
FIGS. 5A–5C are signal diagrams.
Figure 5B:
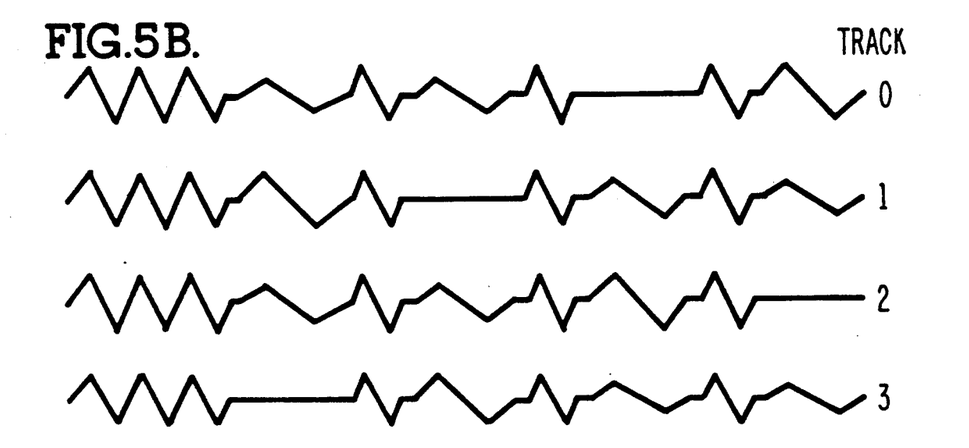
Figure 5C:
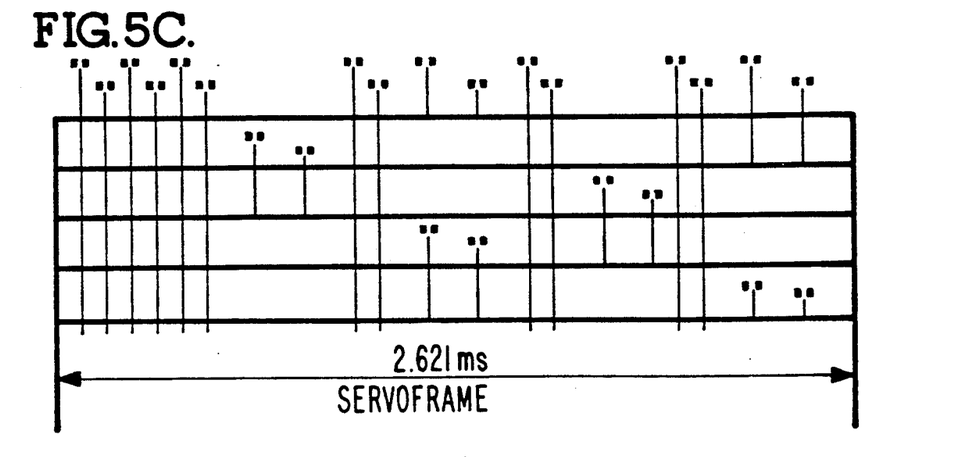

SERVO, GENERALLY (FIG. 5)

FIG. 5 is a block diagram of a disk drive servo system of the type contemplated here.

Preferably, the system uses two independent actuators per HDA. Each actuator has its own set of read/write logic with separate power inputs, and each actuator is microprocessor controlled. The microprocessor decodes and executes various servo/seek routines. It determines the cylinder required by the system and seeks to that cylinder. The microprocessor monitors control of various servo signals to ensure proper operation.

Figure 6:
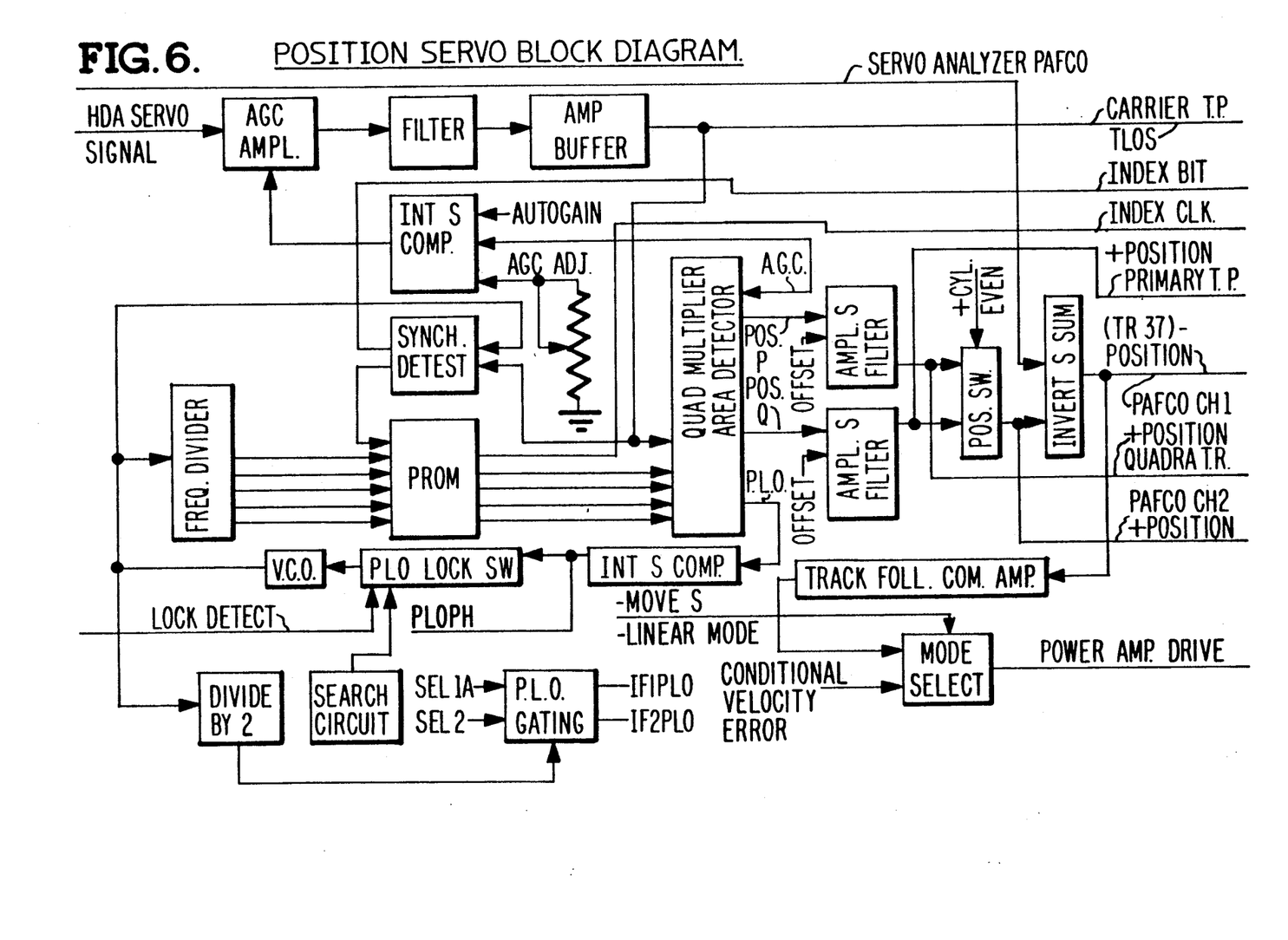

The "Position Servo" aspect of the servo system is indicated in the block diagram of FIG. 6, featuring decoding means for the "primary position signal" and the related "quad. position signal", as well as a track-following servo loop.

Figure 7:
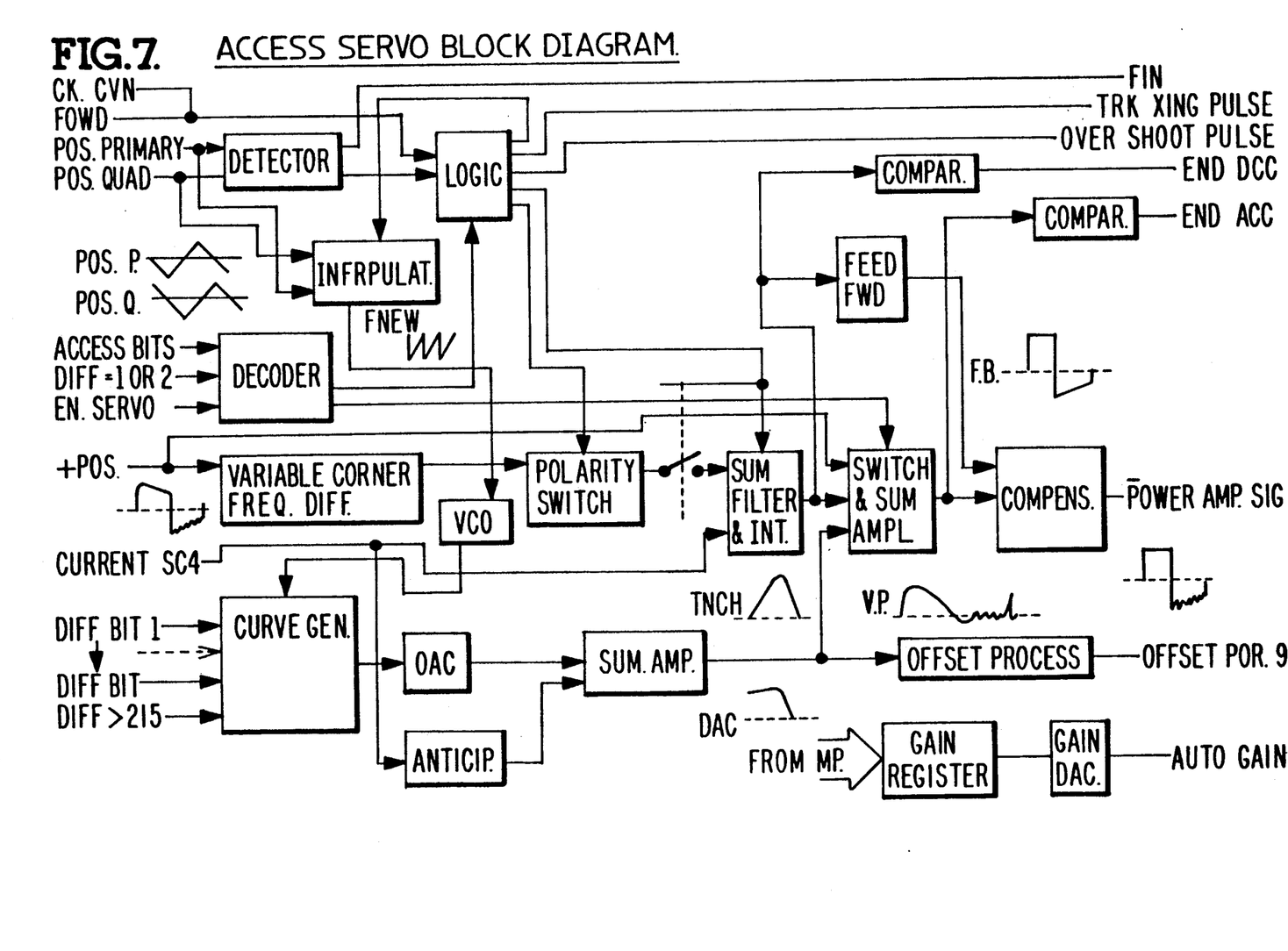

The "Access Servo" aspect of the servo system is indicated in the block diagram of FIG. 7. "Access" begins by moving the actuator (heads) to the required "cylinder" (tracks) upon command issued by the microprocessor. The "length" of the seek is loaded from the difference counter on the DAC (FIG. 7). This access servo makes use of the "optimum time control" theory (bang-bang control system). The microprocessor controls the access servo through "access bits", enablement and direction signals.

The access servo "reports" to the microprocessor an "end accelerate" signal, an "end decelerate" signal, and "track crossing" pulses (to decrement the difference counter).

Figure 8:
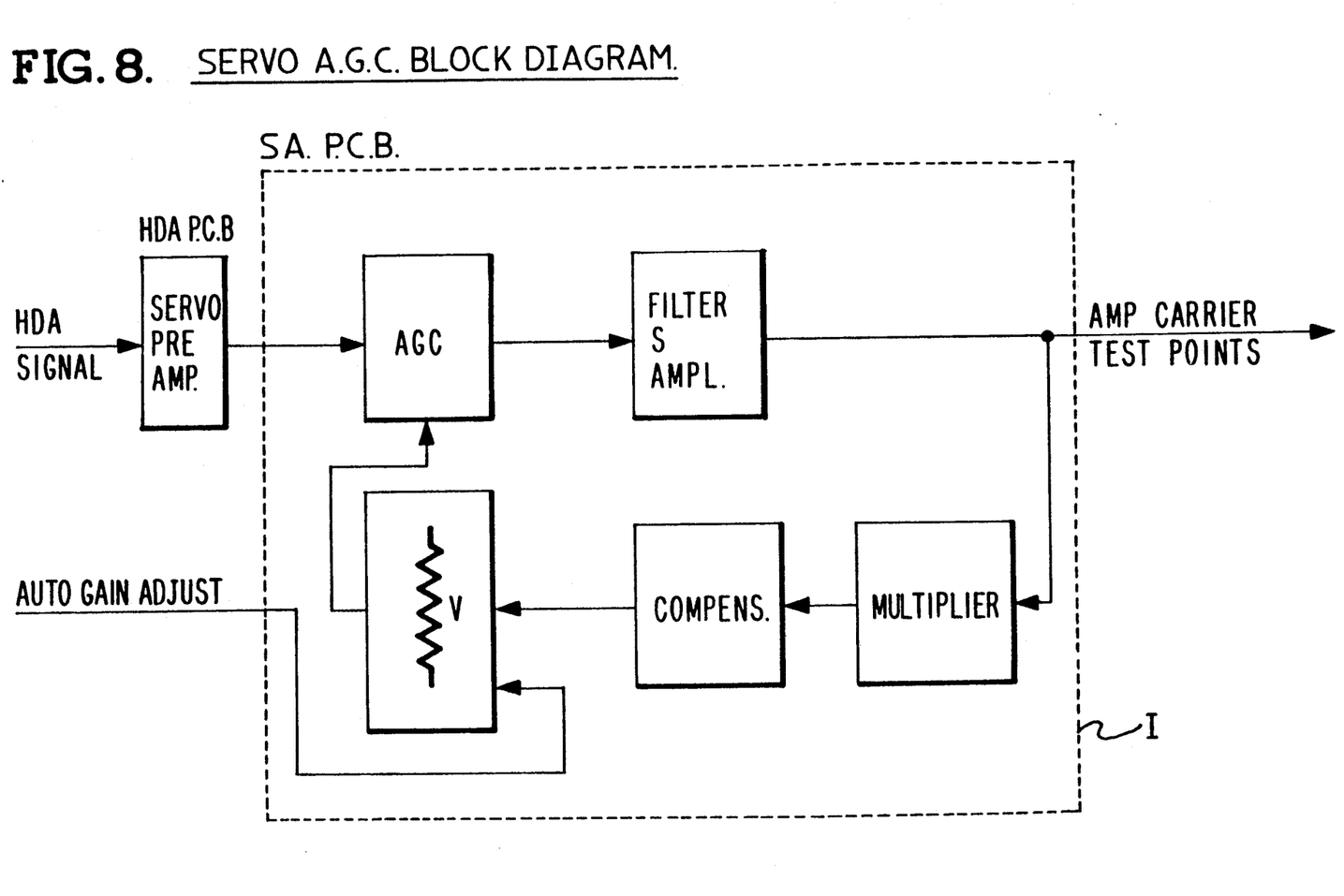

The Servo AGC Loop (automatic gain control) aspects of the system are indicated in the block diagram of FIG. 8.

Figure 9:
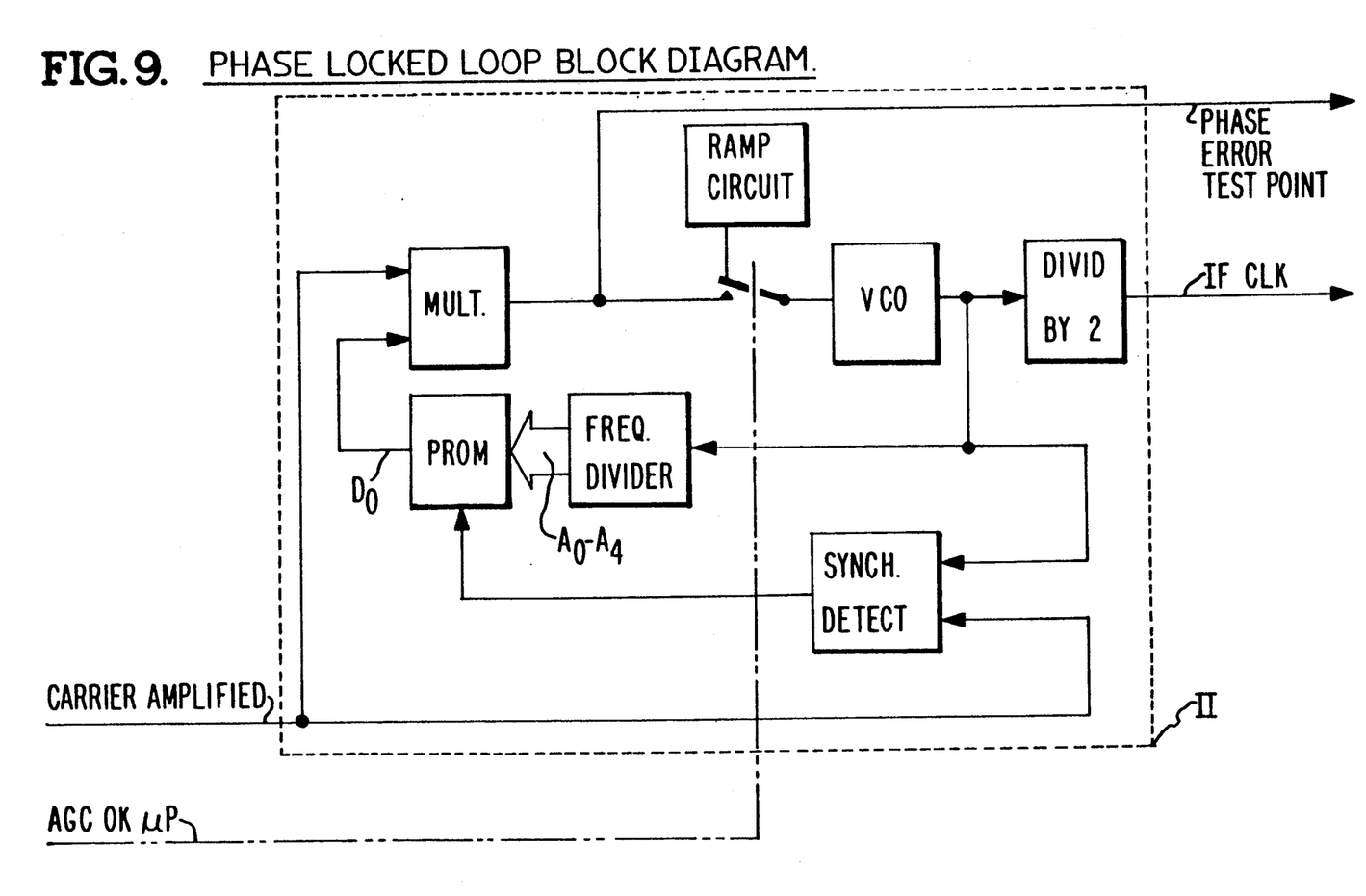
Figure 10:
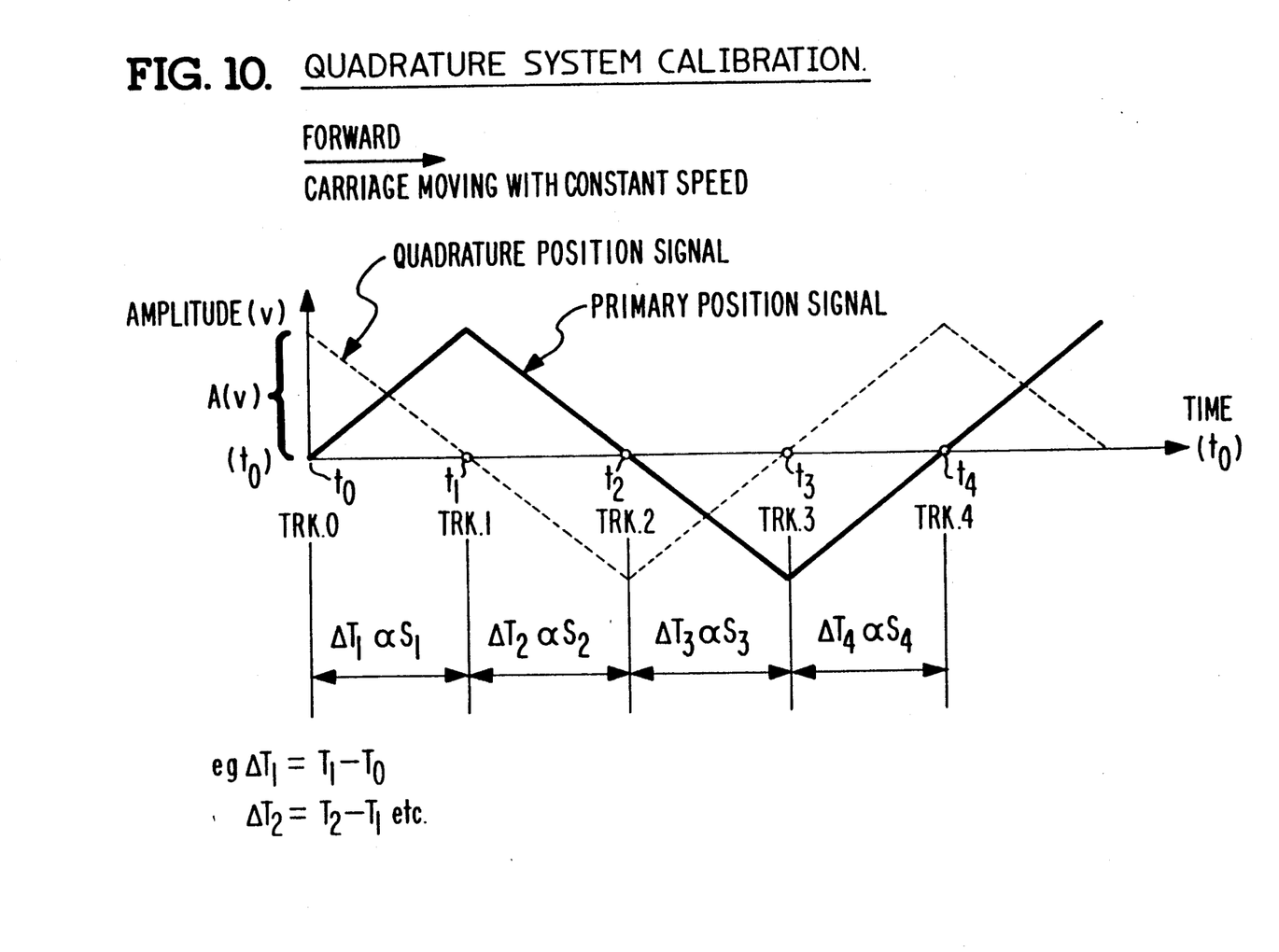
FIG. 10 is a representative plot of servo position signals.
Figure 11:
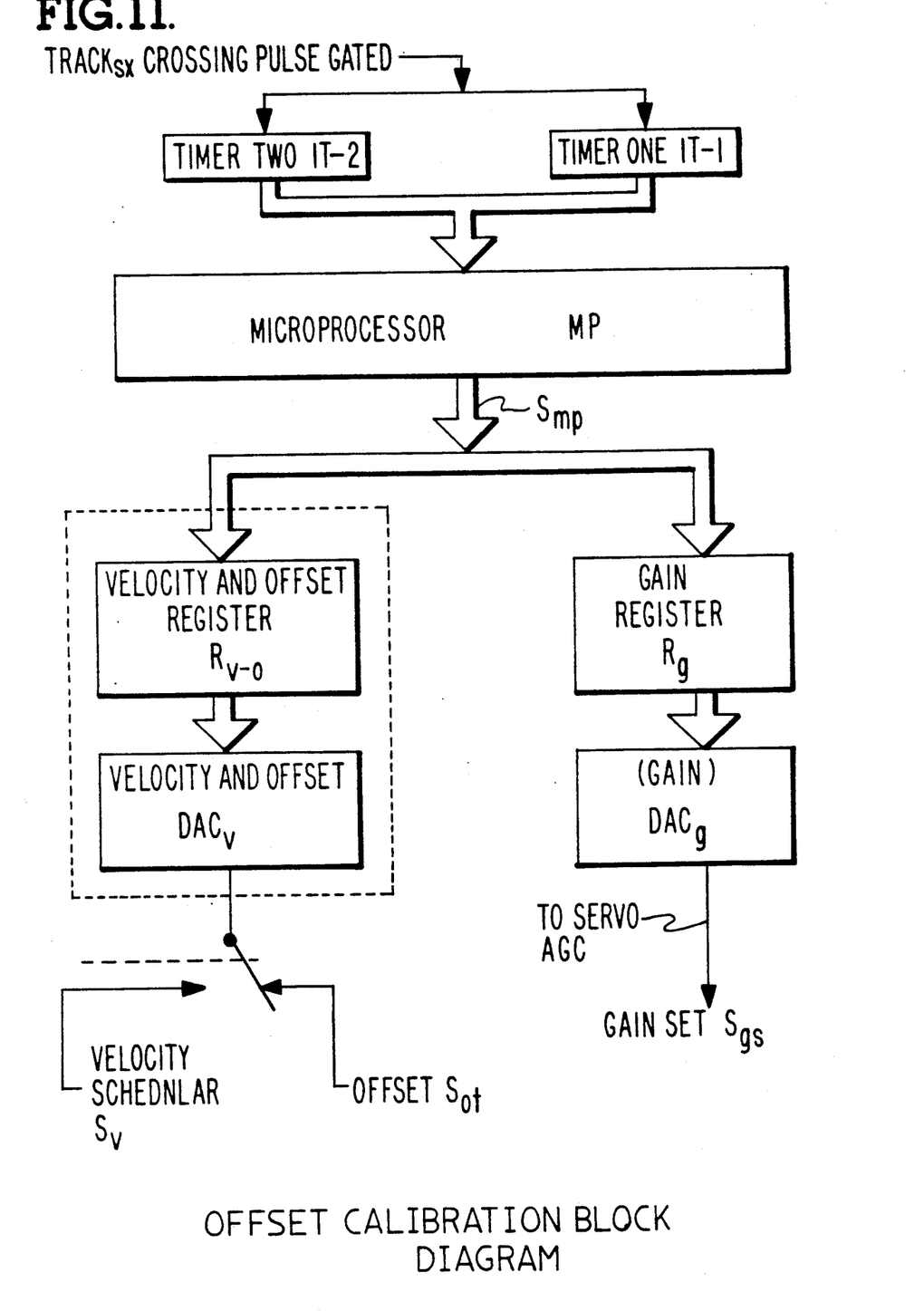
FIG. 11 is a block diagram of a preferred "offset calibration" system herefor.
Figure 51:
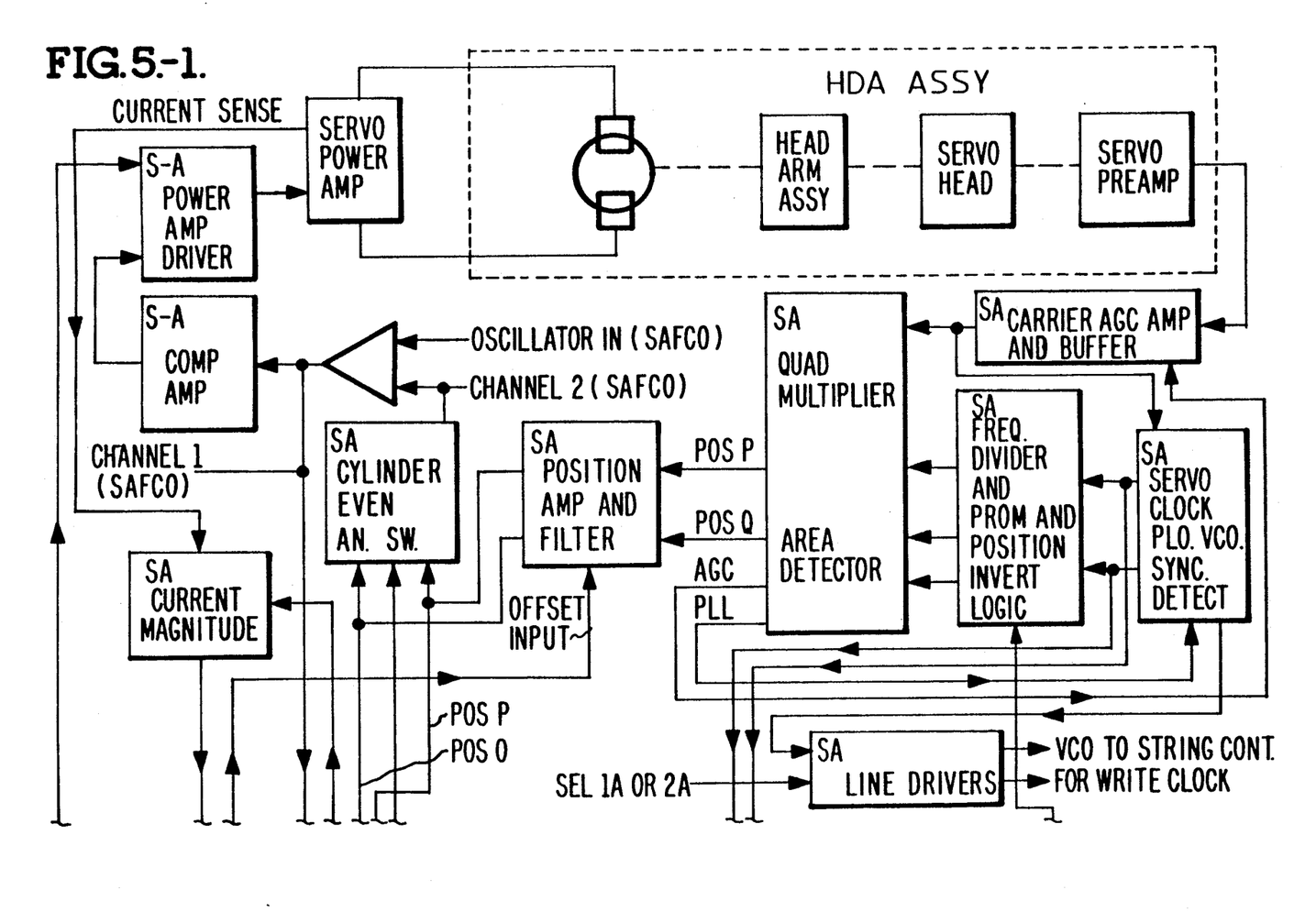

The Phase Locked Loop (PLL) aspects of the system are indicated in the block diagram of FIG. 9.

One can recapitulate the general servo control loop in somewhat more particular fashion than FIG. 1A. Thus, workers may assume an actuator control unit ACT (for a given servo disk surface D-SF, being coupled to related data disks) as operating to feed position information to a converter stage (Pos Trans) which in turn feeds a velocity decoder stage, responsively issuing velocity signals $S_v$ and a track following (compare) stage, issuing "offset" signals $S_p$.

Position signals $S_x$ are also fed to the microprocessor MP for development of velocity control (reference) signals $v_{vy}$ from a curve generator stage. A summing means V.E. receives these reference signals $S_{vy}$ and compares them with the actual velocity information $S_v$ and responsively issues accelerate/decelerate commands Sa in a well-known manner to control the actuator ACT. In time-phased fashion, a switch unit $SW_o$ presents the offset and velocity signals to actuator unit ACT via a related amplifier stage.

"TRACK-OFFSET"; SERVO ADJUSTMENT

One of the major causes of "data error" in disk files is "track interference", i.e., read-back data from one track picking up "noise" from data signals written in an adjacent track. Such interference is unlikely however if the dimension of the head gap Lg (plus fringing flux) is less than track pitch.

The head-gap width dimension is determined by "flying-height", "bit density" and required read-back signal amplitude (to achieve the prescribed signal-to-noise ratio). Track pitch is determined by the required storage capacity of the disk (file) in light of the available net space on the disk, after allowing for enough guard-band area (to insure HDA safety, given prescribed crash-stop provisions).

For maximum storage capacity, given a prescribed head-gap dimension, one should minimize track pitch. The tolerance on track pitch is set by such factors as:

- Distortion on the input servo signal, introduced by electronic component tolerance (can cause an offset on odd tracks relative to even tracks);
- Servo-writer positioning system tolerances.
- "Thermal offset".
- "D.C. offset", introduced by electronic operational amplifier.

To minimize the effect of such factors, the following microprocessor-based method is here presented, whereby one may automatically correct for errors in track spacing and, accordingly, determine a responsive adjustment in servo gain.

CONCLUSION

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to other related servo systems and the like. Also, the present invention is applicable for positioning with other forms of recording and/or reproducing, whether on disks or otherwise —e.g., with media on which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. A method for determining servo position data in a disk drive system characterized by prescribed synchronizing pulses and including one or several disks and one or more data channels along which position signals and other data signals are conducted, each disk having disk tracks which abut and are arranged to be transduced by a prescribed transducer head, this method comprising:

arranging the system to generate distinct, substantially identical timing sequences which reflect initial synchronizing pulses and following "padding" pulses adapted to minimize "tail-overshoot," each data channel of the disk drive system to handle position signals including a prescribed quadrature position code; and arranging and designing said position signals, and so recording them in track bands flanking prescribed disk tracks, so as to be detected by reading means for centering purposes, said position pulses being recorded to follow said timing sequences and to fall between a said initial synchronizing pulse and its following padding pulse; the center of each such disk track band being arranged to be determined by balancing output signals read from flanking track bands; said transducer head being arranged to span adjacent track-bands to render such a balancing read-out.

2. The method as recited in claim 1 wherein the balancing is performed so as to equalize said output signals.

3. The method as recited in claim 2 wherein the servo position signals are written on a servo band portion of at least one disk, co-mounted and co-rotated in a disk stack on a common actuator, with all transducer heads being position-controlled by those position signals.

4. The method as recited in claim 3 wherein the servo position signals comprises "Primary" and "Quadrature" position signals.

* * * * *